United States Patent
Schmitz et al.

(10) Patent No.: US 9,939,640 B2
(45) Date of Patent: Apr. 10, 2018

(54) METHOD AND APPARATUS FOR CONTROLLING THE POSITION OF A HEAD-UP DISPLAY IMAGE COMBINER

(71) Applicant: FORD GLOBAL TECHNOLOGIES, LLC, Dearborn, MI (US)

(72) Inventors: Claus Schmitz, Cologne (DE); Dietmar Koesters, Leverkusen (DE)

(73) Assignee: Ford Global Technology, LLC, Dearborn, MI (US)

( * ) Notice: Subject to any disclaimer, the term of this patent is extended or adjusted under 35 U.S.C. 154(b) by 118 days.

(21) Appl. No.: 15/177,939

(22) Filed: Jun. 9, 2016

(65) Prior Publication Data

US 2016/0363766 A1 Dec. 15, 2016

(30) Foreign Application Priority Data

Jun. 12, 2015 (DE) .................. 10 2015 210 753

(51) Int. Cl.
| | |
|---|---|
| *B60R 22/00* | (2006.01) |
| *G02B 27/01* | (2006.01) |
| *B60H 1/00* | (2006.01) |
| *B60K 35/00* | (2006.01) |
| *B60K 37/04* | (2006.01) |

(52) U.S. Cl.
CPC ..... *G02B 27/0149* (2013.01); *B60H 1/00785* (2013.01); *B60K 35/00* (2013.01); *B60K 37/04* (2013.01); *B60K 2350/2052* (2013.01); *B60K 2350/401* (2013.01); *G02B 2027/0154* (2013.01)

(58) Field of Classification Search
CPC ........ G02B 27/0149; G02B 2027/0154; B60H 1/00785; B60K 35/00; B60K 37/04; B60K 2350/2052; B60K 2350/401; G09G 5/00

USPC ........ 701/49; 359/630, 632; 296/70; 40/593; 345/7

See application file for complete search history.

(56) References Cited

U.S. PATENT DOCUMENTS

| | | | | |
|---|---|---|---|---|
| 5,334,995 A | * | 8/1994 | Iino .................... | G02B 27/0101 340/461 |
| 6,134,051 A | * | 10/2000 | Hayakawa ......... | G02B 17/0816 359/630 |
| 2002/0034016 A1 | * | 3/2002 | Inoguchi ................ | G03B 21/10 359/630 |
| 2004/0239583 A1 | * | 12/2004 | Shelton .............. | G02B 27/0101 345/7 |
| 2012/0224061 A1 | * | 9/2012 | Pilgrim ..................... | B60R 1/00 348/148 |
| 2016/0075310 A1 | * | 3/2016 | Terai ..................... | B60H 1/242 454/127 |

(Continued)

FOREIGN PATENT DOCUMENTS

JP 2008213719 A 9/2008

*Primary Examiner* — Shardul D Patel
(74) *Attorney, Agent, or Firm* — Frank A. MacKenzie; Brooks Kushman P.C.

(57) ABSTRACT

A head-up display in a motor vehicle has an image combiner movable between an active position, in which it is situated in the field of view of a driver of the vehicle, and an inactive position, in which it is situated close to a surface of or within an instrument panel. The position of the image combiner is controlled depending on signals from vehicle devices that indicate a likelihood or probability of a fogging condition of the windshield. The fogging condition may be indicated by a driver actuation of a windshield defogging/heating system.

19 Claims, 1 Drawing Sheet

(56) References Cited

U.S. PATENT DOCUMENTS

2016/0125631 A1* 5/2016 Ham .................. G06T 7/0042
345/633

* cited by examiner

METHOD AND APPARATUS FOR CONTROLLING THE POSITION OF A HEAD-UP DISPLAY IMAGE COMBINER

CROSS-REFERENCE TO RELATED APPLICATIONS

This application claims foreign priority benefits under 35 U.S.C. § 119(a)-(d) to DE 10 2015 210 753.1 filed Jun. 12, 2015, which is hereby incorporated by reference in its entirety.

TECHNICAL FIELD

The invention relates to a head-up display for displaying graphic information to a driver of a motor vehicle, and more specifically to such a head-up display having an image combiner that is independent of the windshield of the vehicle, such as, e.g., a transparent projection disk, which is movable between an active position, in which it is situated in the field of view of the driver of the vehicle and relatively close to the windshield, and an inactive position, in which it is situated outside the field of view of the driver and relatively flush with (or housed within) a vehicle instrument panel (dash board).

BACKGROUND

A movable image combiner of the type described above is usually located in the inactive position when the vehicle is parked, and moves into the active position when the vehicle is started or in response to a dedicated driver request. A known head-up display device is taught by DE 10 2004 015 275 A1, wherein the image combiner is formed by a prism, which can be lowered in the instrument panel. The present invention, however, is directed to all possible head-up displays having a separate image combiner, e.g., having a simple disk made from glass or plastic, which can be retracted into the instrument panel or can be folded down to be flush (or nearly flush) with a surface thereof In addition, the term "image combiner", as used here, is intended to mean not only devices having a projection area, onto which the information from the instrument panel that is supposed to be displayed to the driver is projected and, there, is combined with the scenery that can be seen in the direction of travel, but also any other transparent displays having light pixels integrated therein and that have already been realized and that can provide the driver with a view all the way through.

In the case of such head-up displays having a separate image combiner, it is generally preferable to situate the image combiner as close as possible to the windshield, inter alia, because the virtual image of the information displayed to the driver is supposed to be located as far away from the eyes of the driver as possible, so that the eyes of the driver do not need to focus back and forth too extremely when moving between the scenery in front of the vehicle and the displayed information.

An image combiner located close to the windshield, due simply to its distance from the eyes of the driver, should also be relatively wide and may extend up close to the driver-side A-pillar. In addition, separate image combiners are preferably used in vehicles having sharply-angled (or raked) windshields, which devices are unsuitable for direct projection onto the windshield, and, in this case, the image combiner should stand substantially more upright than the windshield. In this case, an intermediate space between the windshield and the image combiner results, the space having an approximately triangular cross section. Even if recirculation flaps or defroster nozzles on the instrument panel are advantageously disposed in the space between the windshield and the image combiner, regions form—as the inventors have determined—having very little air flow on the windshield, in which areas the windshield fogs up particularly easily and, in fact, first in its lower corner toward the A-pillar.

The possibility that a windshield having an image combiner located closely thereto may tend to fog up is known per se from JP 2008213719 A, and said document addresses the problem by designing the image combiner with an integrated air distribution duct, through which defroster air is blown, which air impacts the windshield at the upper end of the image combiner.

SUMMARY

In a disclosed embodiment, the position of the image combiner may be determined not only by the position of a dedicated switch for activating or deactivating the head-up display, but also may be automatically selected depending on signals generated by other switches or sensors. This relieves the driver of having to think about the cause of fogging of the windshield by the extended head-up display, and provides a method/apparatus that can be implemented particularly easily and by using the hardware available in modern motor vehicles.

In a disclosed embodiment, the one or more signals indicating a windshield fogging condition comprise a driver command to carry out an anti-fogging operation, e.g., by opening recirculation flaps or defroster nozzles in order to blow warm air onto the inner surface of the windshield, and/or by switching on an electric windshield heater. Therefore, the head-up display is easily deactivated—which the driver is accustomed to doing anyway when he notices a fogging of the windshield—by actuating a dedicated switch of a ventilation or climate control device, which switch can be, e.g., a start switch for maximum anti-fogging operation by means of blast air or a start switch for an electric windshield heater.

The signals that indicate a probability of fogging of the windshield can comprise, additionally or alternatively, a probability of a fogging of the windshield determined on the basis of environmental sensor signals. In this case, the sensor signals can reflect one or more of the following variables: the relative humidity in the vehicle; the temperatures inside and outside the vehicle; the speed and, optionally, the temperature of the air acting upon the windshield.

In one embodiment, the image combiner located in the active position is moved to the inactive position when the probability of the fogging of the windshield is above a preselected threshold value and no windshield defogging/heating device or system is activated. In contrast, the image combiner remains in the active position or is returned to the active position when the probability of the fogging of the windshield is below a preselected threshold value, which can be identical to the aforementioned threshold value, or when a windshield defogging/heating device or system is activated.

If the position of the image combiner can be changed without a temporal connection to a driver command, the driver can and should be informed before the position is changed.

In a vehicle designed for carrying out the method, a ventilation or climate-control device has a dedicated anti-fogging operation switch and is connected to a body control module in such a way that an actuation of the stated switch not only carries out an anti-fogging operation, but also brings the image combiner into the inactive position.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
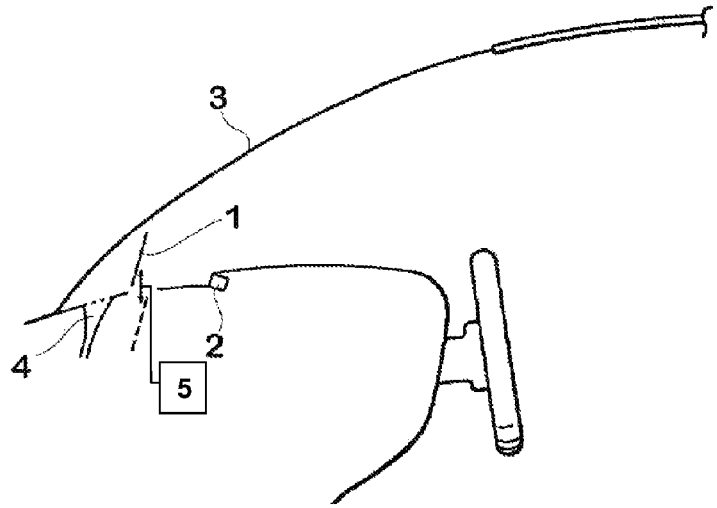
FIG. 1 shows a longitudinal sectional view through a motor vehicle comprising a head-up display having an extendable projection disk.

As shown in FIG. 1, a transparent projection disk 1 is located in a motor vehicle having a head-up display (HUD), which disk is located above the top of the instrument panel, within the field of view of the driver, and can be retracted into and extended out of the instrument panel by means of an electric motor 5, as is schematically illustrated using a double arrow, with the retracted position indicated by dashed lines. Rather than being lowered into the instrument panel when in the retracted position (as indicated in FIG. 1), the projection disk 1 may lay flat against the top of the instrument panel when retracted. This may be achieved, for example, by folding or rotating downward and rearward about a pivot point adjacent the lower edge of the disk. The projection disk 1 serves as an image combiner, which reflects an image projected by a projector 2 in the direction of the eyes of the driver and combines said image with the part of the scenery in front of the vehicle that is viewed through the projection disk 1. If the projection disk 1 is extended, it is located relatively close to a windshield 3 of the vehicle. Defroster nozzles 4 in the instrument panel open into the space between the projection disk 1 and the windshield 3.

Figure 2:
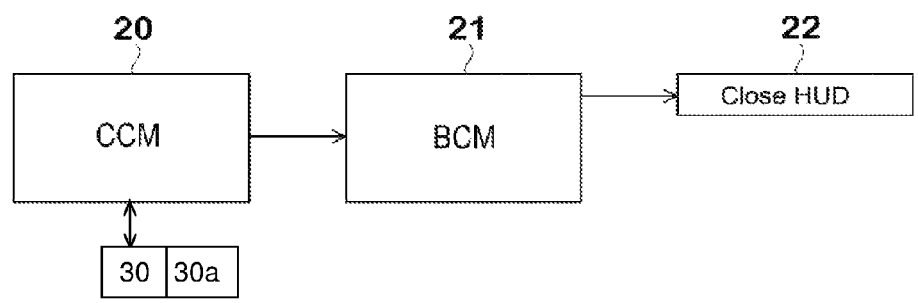
FIG. 2 shows a block diagram of a first exemplary embodiment.

With reference to FIG. 2, a climate control module (CCM) 20 is operatively connected with a device 30 having a switch 30a, wherein, when said switch 30a is actuated by the driver, an anti-fogging operation is carried out. Device 30 may comprise, for example, an air blower and the switch 30a may be operable to command maximum anti-fogging operation by blowing a maximum amount of warm air through the defroster nozzles 4 onto the windshield 3.

If the vehicle is so equipped, the device 30 may comprise an electric windshield heater, which may be activated by a dedicated switch 30a therefor, or the windshield heater may be switched on by switching on the maximum anti-fogging operation, or is switched on in combination with any other commands or conditions.

A body control module (BCM) 21 controls various devices which are powered and/or controlled via the vehicle electric system and may be connected to the CCM 20 via a vehicle bus such as, e.g., a CAN bus. When the BCM 21 receives the signal, from the CCM 20, that a switch for maximum anti-fogging operation or a switch for the windshield heater is in its "on" position, the BCM 20 causes, via the CAN bus, in the block 22 (referring to FIG. 3), the projection disk 1 of the HUD to be retracted or closed in another manner, and the projector 2 to be switched off. The projection disk 1 of the HUD can be extended again and the projector 2 can be switched on again as soon as the anti-fogging operation switch is back in the "off" position or when an "extend" command is issued in any other manner.

Figure 3:
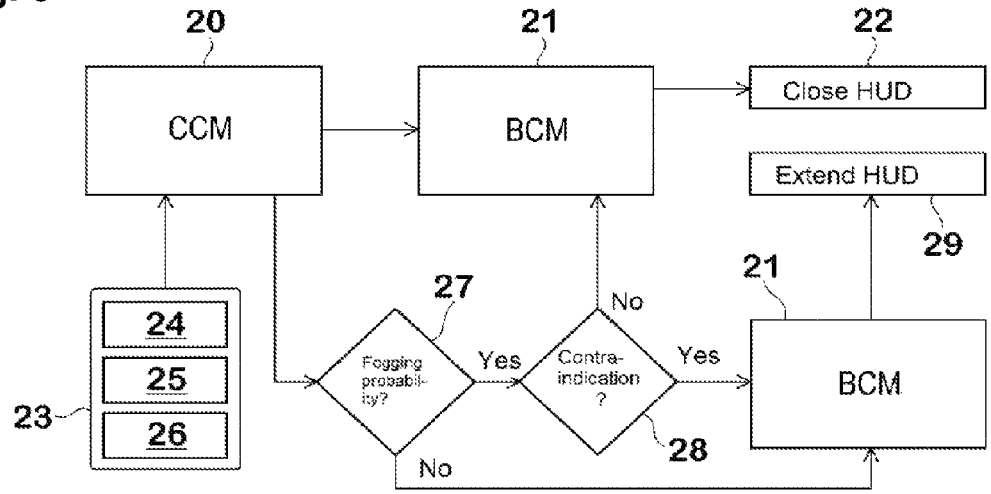
FIG. 3 shows a block diagram of a second exemplary embodiment.

In the exemplary embodiment depicted in FIG. 3, the retraction or extension of the projection disk 1 of the HUD does not depend—or does not depend only—on a driver command as an indication of a fogging of the windshield, but rather on further indications, specifically on the present probability of a fogging of the windshield and a contra-indication for fogging.

Specifically, in FIG. 3, the CCM 20 receives different signals from a block 23, via the CAN bus, such as, e.g., the temperatures 24 inside and outside the vehicle, the relative humidity 25 in the vehicle. Such environmental conditions may detected using available sensors associated with the vehicle climate control system. Other signals that may be relevant to the presence of a fogging condition are the speed 26 and, optionally, the temperature of the air flowing out of the defroster nozzles 4 onto the windshield 3. The latter variable does not necessarily have to be detected using sensors, but rather may be available in the form of corresponding control commands.

On the basis of the variables 24, 25 and 26, the CCM 20 calculates, in the block 27, a probability that the windshield 3 will fog up when the projection disk 1 is extended. If the calculated probability is below a previously stored threshold value, the body control module 21 (shown here in duplicate only for purposes of illustration) extends the projection disk 1 in the block 29, provided it has not already been extended or provided the driver has not selected the operating mode without head-up display, and switches on the projector 2.

If, in block 27, the calculated probability is at least equal to the previously stored threshold value, a check is carried out in block 28 to determine whether there is a contra-indication for fogging, specifically that fogging will very likely not occur. This may be the case, for example, if the vehicle has a windshield heater and the windshield 3 is presently being heated. If so, in block 29, the projection disk 1 is extended, provided it has not already been extended or provided the driver has not selected the operating mode without head-up display, and the projector 2 switches on.

If the answer to the query in block 28 is that the windshield 3 is not heated, the body control module 21 causes, in block 22, the projector 2 to be switched off and the projection disk 1 to be retracted into the instrument panel 3, provided it has not already been retracted therein.

Instead of calculating a probability of a fogging of the windshield 3 by means of the variables 24, 25 and 26, a fogging of the windshield 3 could also be determined more directly, e.g., by means of optical fogging sensors on the windshield 3, and the result can then be used as the basis for the decision in block 27.

In order to ensure that the driver is not irritated by an unexpected retraction or extension of the projection disk 1 in blocks 22 and 29, this can be communicated to him a few seconds in advance, e.g., by means of a visual and/or acoustic message.

The exemplary embodiments from FIGS. 2 and 3 can also be combined, in that the driver is also provided with the option, in the exemplary embodiment from FIG. 3, of bringing about an unconditional retraction of the projection screen 1 windshield 3, in that said driver, e.g., actuates a start switch for maximum defroster air. In this manner, the driver can easily and intuitively cancel a possible wrong decision in FIG. 3.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for operating a head-up display in a vehicle, comprising:
   operating a device to generate a signal indicating that a windshield fogging condition exists adjacent to an image combiner; and
   operating a control module to receive the signal and, in response thereto, command activation of an electric motor to move an image combiner from an extended position relatively closer to the windshield to a retracted position relatively farther from the windshield.

2. The method of claim 1, wherein the signal is generated by a driver command to carry out an anti-fogging operation.

3. The method of claim 2, wherein the driver command comprises actuation of a switch of a climate control device.

4. The method of claim 3, wherein the switch controls at least one of a climate control air blower and a windshield heater.

5. The method of claim 1, wherein the device is a sensor detecting an environmental condition.

6. The method of claim 5, wherein the environmental condition is at least one of a relative humidity in the vehicle, a temperature inside the vehicle, a temperature outside the vehicle, a speed of the vehicle, and a temperature of air blowing onto the windshield.

7. The method of claim 5, wherein the control module is further operable to receive a second signal from a second device indicating a vehicle anti-fogging device is activated and, in response thereto, prevent activation of the motor so that the image combiner remains in the extended position.

8. The method of claim 7, wherein the second signal indicates actuation of a switch of a climate control device.

9. The method of claim 8, wherein the climate control device comprises at least one of an air blower and a windshield heater.

10. The method of claim 1 further comprising informing a vehicle driver on an impending change in position of the image combiner prior to the change of position.

11. A method for operating a head-up display in a vehicle, comprising:
    operating a control module to a) receive a first signal from a vehicle sensor indicating an environmental condition inside the vehicle, b) determine from the signal that a windshield fogging condition exists, and c) command activation of a motor; and
    activating the motor to move an image combiner from an extended position relatively closer to the windshield to a retracted position relatively farther from the windshield.

12. The method of claim 11, further comprising:
    operating the controller to receive a second signal indicating a vehicle anti-fogging device is activated and, in response thereto, prevent activation of the motor so that the image combiner remains in the extended position.

13. The method of claim 12, wherein the second signal indicates actuation of a switch of a climate control device.

14. The method of claim 13, wherein the climate control device comprises at least one of an air blower and a windshield heater.

15. Apparatus comprising:
    a head-up display having an image combiner movable between an extended position relatively closer to a windshield to a retracted position relatively farther from the windshield;
    an electric motor operative to move the image combiner between the extended and retracted positions;
    a device generating a signal indicating that a windshield fogging condition exists; and
    a climate control module operable to receive the signal and, in response thereto, command activation of the electric motor to move the image combiner from the extended position to the retracted position.

16. The apparatus of claim 15, wherein the device comprises climate control device operable to carry out an anti-fogging operation.

17. The apparatus of claim 16, wherein the signal indicates actuation of a switch of the climate control device.

18. The apparatus of claim 17, wherein the climate control device comprises at least one of an air blower and a windshield heater.

19. The apparatus of claim 15, wherein the device is a sensor detecting an environmental condition.

* * * * *